United States Patent
Kousaka et al.

(10) Patent No.: US 9,096,750 B2
(45) Date of Patent: Aug. 4, 2015

(54) FIBER-REINFORCED RESIN COMPOSITION

(75) Inventors: Shigeyuki Kousaka, Himeji (JP);
Toshio Oguni, Himeji (JP); Masahiko Itakura, Himeji (JP)

(73) Assignee: DAICEL POLYMER LTD., Minato-ku, Tokyo (JP)

( * ) Notice: Subject to any disclaimer, the term of this patent is extended or adjusted under 35 U.S.C. 154(b) by 0 days.

(21) Appl. No.: 14/344,175

(22) PCT Filed: Sep. 10, 2012

(86) PCT No.: PCT/JP2012/073009
§ 371 (c)(1),
(2), (4) Date: Mar. 11, 2014

(87) PCT Pub. No.: WO2013/051369
PCT Pub. Date: Apr. 11, 2013

(65) Prior Publication Data
US 2014/0343196 A1  Nov. 20, 2014

(30) Foreign Application Priority Data

Oct. 5, 2011 (JP) ................................. 2011-220772
Aug. 21, 2012 (JP) ................................. 2012-182123

(51) Int. Cl.
*C08L 1/00* (2006.01)
*C08L 5/00* (2006.01)
*C08L 23/12* (2006.01)
*C08J 5/04* (2006.01)
*C08L 77/02* (2006.01)
*C08L 77/06* (2006.01)
*C08L 1/02* (2006.01)
*C08L 77/00* (2006.01)
*C08K 7/02* (2006.01)
*C08L 51/06* (2006.01)

(52) U.S. Cl.
CPC .. *C08L 23/12* (2013.01); *C08J 5/04* (2013.01); *C08K 7/02* (2013.01); *C08L 1/02* (2013.01); *C08L 51/06* (2013.01); *C08L 77/00* (2013.01); *C08L 77/02* (2013.01); *C08L 77/06* (2013.01); *C08L 2205/025* (2013.01); *C08L 2205/03* (2013.01); *C08L 2205/16* (2013.01)

(58) Field of Classification Search
USPC ......................................................... 524/35
See application file for complete search history.

(56) References Cited

FOREIGN PATENT DOCUMENTS

| JP | 08-232146 |  | 9/1996 |  |  |
|----|-----------|---|--------|---|---|
| JP | 09-031744 |  | 2/1997 |  |  |
| JP | 09031744  | A | * 2/1997 | ................ | D01F 2/04 |
| JP | 09-256216 |  | 9/1997 |  |  |
| JP | 2008-013693 | A | 1/2008 |  |  |
| JP | 2008-202012 | A | 9/2008 |  |  |
| JP | 2011-162905 |  | 8/2011 |  |  |
| JP | 2011-162905 | A | 8/2011 |  |  |
| JP | 2011162905 | A | * 8/2011 |  |  |

OTHER PUBLICATIONS

Translation of JP 2011-162905, Aug. 25, 2011.*
Translation of JP 09-031744, Feb. 4, 1997.*
International Search Report of PCT/JP2012/073009 (2 pgs.).
English translation of International Preliminary Report on Patentability and Written Opinion of the International Searching Authority for PCT/JP2012/073009 (5 pages).
Supplementary European Search Report dated Apr. 21, 2015 (7 pgs.).
New Long Rayon Fiber Reinforced Thermoplastics Utilizing the LFT-D Process, by Dr. Frank Henning et al, Fraunhofer Institut Chemische Technologie, Sep. 2005, 34 pgs.
High-tenacity man-made cellulose fibre reinforced thermoplastics—Injection moulding compounds with polypropylene and alternative matrices, by J. Ganster et al, Composites Part A: Applied Science and Manufacturing, Elsevier Science Publishers, vol. 37, No. 10, Oct. 2006, pp. 1796-1804.
Comparative Characterisation of Man-Made Regenerated Cellulose Fibres, by Thomas Röder et al, Lenzinger Berichte, 2009, pp. 98-105.

* cited by examiner

*Primary Examiner* — Hui Chin
(74) *Attorney, Agent, or Firm* — Flynn, Thiel, Boutell & Tanis, P.C.

(57) ABSTRACT

A fiber-reinforced resin composition which is capable of providing a light-weight molded article that has a high mechanical strength. The fiber-reinforced resin composition contains (A) a thermoplastic resin and (B) resin-impregnated filament bundles containing rayon fibers. The rayon fibers of the component (B) have a fiber diameter of 5-30 μm and an X-ray orientation degree of 86% or more. The resin-impregnated filament bundles are obtained by: tying 2,000-30,000 rayon fibers of the component (B) lined up in the longitudinal direction together in a bundle; integrating the bundle of the rayon fibers by impregnating the bundle with the thermoplastic resin of the component (A) in a molten state; and then cutting the integrated bundle into pieces 3-30 mm long.

9 Claims, No Drawings

FIBER-REINFORCED RESIN COMPOSITION

TECHNICAL FIELD

The present invention relates to a fiber-reinforced resin composition capable of providing a molded article which is lightweight and has high mechanical strength, especially high specific modulus, and a molded article obtained therefrom.

BACKGROUND ART

Resin molded articles are used as a metal substitute for the purpose of weight saving, and in order to improve mechanical strengths, molding of a resin composition in which a fiber is blended has been known.

In JP-A 2008-013693, there is disclosed an invention of a long fiber-reinforced thermoplastic resin composition for automobile outer plate members obtained by blending a reinforcement fiber in an amount of 25 to 200 parts by weight relative to 100 parts by weight of a composition in which a weight ratio of a thermoplastic polyurethane (TPU) to a styrene-based resin (SR) (that is, TPU/SR) is 20/80 to 90/10.

It is described that, as a reinforcement fiber, at least one kind of fiber selected from the group consisting of an inorganic fiber made of glass, carbon, silicon carbide, basalt, or boron; a metal fiber made of stainless steel; an organic fiber made of aramid, rayon, nylon, poly naphthalate, polyester, or cellulose is included, but in its Example, urethane-based long fiber glass fiber is used.

In JP-A 2008-202012, there is described an invention relating to a long fiber-reinforced thermoplastic resin composition obtained by blending 11 to 200 parts by weight of a reinforcement fiber relative to 100 parts by weight of a composition composed of a polycarbonate resin (PC) and a styrene-based resin (SR).

It is described that, as a reinforcement fiber, at least one kind of fiber selected from the group consisting of an inorganic fiber made of glass, carbon, silicon carbide, basalt, or boron; a metal fiber made of stainless steel; an organic fiber made of aramid, rayon, nylon, polynaphthalate, or polyester; and a cellulose fiber is included, but in its Example, a glass fiber is used.

SUMMARY OF INVENTION

An object of the present invention is to provide a fiber-reinforced resin composition capable of providing a molded article which is lightweight and has a high mechanical strength, especially high specific modulus, and a molded article obtained therefrom.

The present invention provides, as a means to solve the problem, a fiber-reinforced resin composition comprising a resin-impregnated long fiber bundle including (A) a thermoplastic resin and (B) a rayon fiber, wherein the rayon fiber of the component (B) has a fiber diameter of 5 to 30 µm, and an X-ray orientation degree of 86% or more, and the resin-impregnated long fiber bundle is obtained by impregnating a bundle of the 2,000 to 30,000 rayon fibers of the component (B) in a state where the rayon fibers are arranged in the longitudinal direction, with the thermoplastic resin of the component (A) in a molten state to thereby be integrated, and then cutting the integrated bundle into a length of 3 to 30 mm.

The present invention relates to a molded article obtained from the aforementioned fiber-reinforced resin composition.

The resin-impregnated long fiber bundle contained in the fiber-reinforced resin composition of the present invention can make longer the fiber length of the rayon fiber remaining in a molded article after molding, since there is used the rayon fiber in which cellulose molecules are highly oriented fibers in the longitudinal direction of the fiber (that is, the X-ray orientation degree being 86% or more), and in which a tensile modulus and strength are high.

For this reason, since the mechanical strength (especially specific modulus) of a molded article can be made higher than a fiber bundle in which a conventional inorganic fiber or organic fiber is used, there can be obtained a molded article (for example, plate-like molded article) being lightweight and having high mechanical strength by making its thickness smaller.

DETAILED DESCRIPTION OF THE INVENTION

Fiber-Reinforced Resin Composition

The composition of the present invention contains the resin-impregnated long fiber bundle (resin-impregnated rayon long fiber bundle) containing the component (A) and the component (B), and may be composed only of the aforementioned resin-impregnated long fiber bundle, or may contain other components as necessary.

Component (A)

Examples of the thermoplastic resins of the component (A) can include a polyolefin-based resin, a polyamide-based resin, a styrene-based resin, a polycarbonate resin, polyvinyl chloride, polyvinylidene chloride, a polycarbonate-based resin, an acrylic resin, a methacrylic resin, a polyester-based resin, a polyacetal-based resin, and a polyphenylene sulfide-based resin.

As the thermoplastic resin of the component (A), preferable is one selected from a polyolefin-based resin and a polyamide-based resin.

As the polyolefin-based resin there can be used polypropylene; high-density, low-density and linear low-density polyethylenes; poly-1-butene; polyisobutylene; a copolymer of ethylene and propylene; ethylene-propylene-diene terpolymer (the diene component as a raw material being in an amount of 10% by mass or less); polymethylpentene; random, block and graft copolymers of ethylene or propylene (50% by mole or more) with other copolymerizable monomer (vinyl acetate, an alkyl ester of methacrylic acid, an alkyl ester of acrylic acid, aromatic vinyl, etc.), and the like. Among them, preferable is polypropylene.

When using the polyolefin-based resin as the component (A), in order to make it easy to impregnate the resin into the rayon fiber bundle of the component (B), it is preferable to use an acid-modified polyolefin simultaneously.

As the acid-modified polyolefin, preferable is maleic acid-modified polyolefin (maleic acid-modified polypropylene) and maleic anhydride-modified polyolefin (maleic anhydride-modified polyolefin).

When using the acid-modified polyolefin simultaneously as the component (A), it is preferable to carry out blending so that an acid amount (amount of an acid contained in the acid-modified polyolefin in the component (A)) in the component (A) may be, on average, in the range of 0.005 to 0.5% by mass in terms of maleic anhydride.

The present invention preferably includes the aforementioned fiber-reinforced resin composition in which the thermoplastic resin of the component (A) includes polypropylene and maleic acid-modified polypropylene and/or maleic anhydride-modified polyolefin, and the acid amount in the component (A) is, on average, 0.005 to 0.5% by mass in terms of maleic anhydride.

As the polyamide-based resin, preferable is one selected from an aliphatic polyamide and an aromatic polyamide.

Examples of the aliphatic polyamides can include polyamide 6, polyamide 66, polyamide 69, polyamide 610, polyamide 612, polyamide 46, polyamide 11, polyamide 12, and the like.

Examples of the aromatic polyamides can include one obtained from an aromatic dicarboxylic acid and an aliphatic diamine, or one obtained from an aliphatic dicarboxylic acid and an aromatic diamine, and examples can include Nylon MXD (metaxylylenediamine and adipic acid), Nylon 6T (hexamethylenediamine and terephthalic acid), Nylon 6I (hexamethylenediamine and isophthalic acid), Nylon 9T (nonanediamine and terephthalic acid), Nylon M5T (methylpentadiamine and terephthalic acid), Nylon 10T (decamethylenediamine and terephthalic acid).

Among them, preferable is the aliphatic polyamide such as polyamide 6, polyamide 69, polyamide 610, polyamide 612, polyamide 11 or polyamide 12.

As the rayon fiber of the component (B), there can be used those described in Lenzinger Berichte 87(2009), p 98-p 105, for example, viscose rayon, polynosic, MODARU, cupra, RIYOSERU (Tencel), Bocell, FORTIZAN (fiber obtained by expanding a cellulose acetate [manufactured by CELANESE Co., Ltd.], and then saponifying with alkali), etc.

In order to make it easy to impregnate the resin into the bundle of the rayon fiber, and in order to enhance the mechanical strength of the molded article, the rayon fiber of the component (B) has a fiber diameter of 5 to 30 μm, and the X-ray orientation degree of 86% or more.

The fiber diameter of the rayon fiber of the component (B) is preferably 6 to 20 μm, more preferably 7 to 15 μm.

The X-ray orientation degree of the rayon fiber of the component (B) is preferably 90% or more.

Here, the X-ray orientation degree is calculated from the equation described in Paragraph number 0012 and Paragraph number 0013 of JP-A 09-31744, and in Paragraph 0020 to Paragraph 0021 of JP-A 09-256216.

The rayon fiber of the component (B) has the aforementioned fiber diameter and the aforementioned X-ray orientation degree, and has a tensile modulus (Young's modulus) of preferably 10 GPa or more, more preferably 13 GPa or more, and further preferably 15 GPa or more.

The rayon fiber of the component (B) is one in which cellulose molecules are highly oriented in the longitudinal direction of the fiber (the X-ray orientation degree being 86% or more), and has high tensile modulus and high interface strength with the resin and is excellent in performances of a long fiber, and thus the rayon fiber is extremely excellent as a fiber for a long fiber-reinforced resin.

The rayon fiber of the component (B) has a stronger activity of the fiber surface and higher reactivity than a natural cellulose fiber having a high crystallinity or the like. Therefore, in order to enhance the effect due to the inclusion of the component (B), it is preferable to use the acid-modified polyolefin as the component (A) simultaneously. By containing the functional group-containing resin as the component (A), the interface strength between the rayon fiber and the resin of the component (A) becomes higher, and thus its physical properties are further enhanced and, at the same time, the improvement of the physical properties due to making a fiber long become larger.

Resin-Impregnated Long Fiber Bundle

The resin-impregnated long fiber bundle can be obtained by impregnating a bundle of the 2,000 to 30,000 rayon fibers of the component (B) in a state where the rayon fibers are arranged in the longitudinal direction, with the thermoplastic resin of the component (A) in a molten state to thereby be integrated, and then cutting the integrated bundle into a length of 3 to 30 mm.

When the number of the rayon fiber in the bundle exceeds 30,000, it does not become possible to carry out the impregnation with the thermoplastic resin of the component (A) molten up to the central part of the fiber bundle, and when the fiber-reinforced resin composition is molded, the dispersion of the fiber becomes bad, which results in a bad appearance and bad mechanical strength. When the number of the rayon fibers in the bundle is less than 3,000, there arises a production problem such as breakage of the fiber bundle at the time of the production of the resin-impregnated fiber bundle. The number of the rayon fibers in the bundle is preferably 3,000 to 25,000, more preferably 5,000 to 25,000.

The resin-impregnated long fiber bundle can be produced by a well-known production method in which a die is used, and there can be employed production methods described in, for example, Paragraph number 7 of JP-A 06-313050, Paragraph number 23 of JP-A 2007-176227, and others such as JP-B 06-2344 (MANUFACTURING AND MOLDING METHOD OF RESIN COATED LONG FIBER BUNDLE), JP-A 06-114832 (FIBER-REINFORCED THERMOPLASTIC RESIN STRUCTURE AND MANUFACTURE THEREOF), JP-A 06-293023 (MANUFACTURE OF LONG FIBER-REINFORCED THERMOPLASTIC RESIN COMPOSITION), JP-A 07-205317 (TAKING-OUT OF FIBER BUNDLE AND PRODUCTION OF LONG FIBER REINFORCED RESIN STRUCTURE), JP-A 07-216104 (MANUFACTURE OF LONG FIBER-REINFORCED RESIN STRUCTURE), JP-A 07-251437 (METHOD AND DEVICE FOR MANUFACTURE OF LONG FIBER-REINFORCED THERMOPLASTIC COMPOSITE MATERIAL), JP-A 08-118490 (CROSSHEAD DIE, AND MANUFACTURE OF LONG FIBER-REINFORCED RESIN STRUCTURE), and the like.

The length of the resin-impregnated long fiber bundle (namely, the length of the rayon fiber of the component (B) contained in the resin-impregnated long fiber bundle) is in the range of 3 to 30 mm, preferably 5 mm to 20 mm, and more preferably 6 mm to 15 mm. When the length is 3 mm or more, the mechanical strength of the molded article obtained from the composition can be enhanced, and when the length is 30 mm or less, the moldability becomes better.

As to a ratio between the amounts of the component (A) and the component (B) in the resin-impregnated long fiber bundle, the amount of the component (A) is preferably 95 to 30% by mass, more preferably 90 to 40% by mass, and further preferably 80 to 40% by mass, the amount of the component (B) is preferably 5 to 70% by mass, more preferably 10 to 60% by mass, and further preferably 20 to 60% by mass.

The fiber-reinforced resin composition of the present invention can contain other known fire retardants and fire-resistant aids, thermostabilizers, lubricants, light stabilizers, antioxidants, colorants, mold lubricants and antistatic agents within a range in which the problem of the present invention can be solved.

Those components may be included in the resin-impregnated long fiber bundle, or may be included separately from the resin-impregnated long fiber bundle.

<Molded Article Consisting of the Fiber-Reinforced Resin Composition>

The molded article of the present invention is obtained by molding the fiber-reinforced resin composition including the aforementioned resin-impregnated long fiber bundle.

When obtaining the molded article of the present invention, in addition to the fiber-reinforced resin composition including the aforementioned resin-impregnated long fiber bundle, the thermoplastic resin of the above-mentioned component (A) can be added as necessary.

Since the resin-impregnated long fiber bundle included in the fiber-reinforced resin composition of the present invention has a good dispersibility in the molten resin, the rayon fiber can be uniformly dispersed in the obtained molded article.

When molding the fiber-reinforced resin composition including the resin-impregnated long fiber bundle of the present invention, although there cannot be avoided the breakage and shortening of the rayon fibers contained in the resin-impregnated long fiber bundle by a force applied at the molding, there is used, in the present invention, rayon fibers in which the cellulose molecules are highly oriented in the longitudinal direction of the fiber (the X-ray orientation degree being 86% or more), and thus the fiber strength is high and the shortening of the rayon fiber due to the aforementioned breakage is suppressed.

In addition, since the strength and elastic modulus of the fiber itself are also high, the mechanical strengths (bending modulus or the like) of the obtained molded article can be enhanced.

Furthermore, since the molded article obtained from the fiber-reinforced resin composition of the present invention contains the rayon fiber having a predetermined tensile modulus and is lightweight in comparison with one containing an inorganic fiber such as glass fiber (namely, being able to lower its density), a molded article having a large specific modulus (bending modulus/density) can be obtained.

In addition, for example, when making a comparison between a rayon long fiber-containing polypropylene molded article and a glass long fiber-containing polypropylene molded article, a specific modulus becomes larger as the blending amount of the rayon fiber or glass fiber becomes larger, and a degree thereof of the rayon long fiber-containing polypropylene molded article is larger than that of the glass long fiber-containing polypropylene molded article.

With respect to the molded article obtained from the fiber-reinforced resin composition of the present invention, a specific modulus of a molded article of 4 mm thickness is preferably 4,000 MPa or more, more preferably 4,500 MPa or more, and further preferably 5,000 MPa or more.

The molded article of the present invention can be made into a desired shape depending on the intended use and, as mentioned above, since the specific modulus can become larger, when being made into a thin plate-like molded article, one being lightweight and having a high mechanical strength can be obtained.

The case where the molded article of the present invention is made into a thin plate-like molded article, for example, even when the thickness is 1 to 5 mm, one having a high mechanical strength can be obtained.

In addition, since the molded article obtained from the fiber-reinforced resin composition of the present invention contains the rayon fiber, when it is burnt, combustion residue like glass fiber does not remain.

Since the molded article of the present invention is lightweight and has a high mechanical strength (especially specific modulus), it can be used as substitutes of metal parts used in the various fields of electric and electronic equipment, communication equipment, automobiles, building materials, daily needs, etc., and is especially suitable for housings of various equipment, and a plate-like sheathing material.

EXAMPLES

Production Example 1

Production of the Resin-Impregnated Long Fiber Bundle

The resin-impregnated long fiber bundles used in Examples 1 to 5 and Comparative Example 1 shown in Table 1 were produced.

A fiber bundle made of long rayon fibers (number of the fibers shown in Table 1) of the component (B) was passed through a crosshead die. At this time, the molten component (A) shown in Table 1 was supplied to the crosshead die from a biaxial extrusion machine (cylinder temperature of 290° C.) in Table 1 in an amount shown in Table 1, and the rayon fiber bundle of the component (B) was impregnated with the molten material.

After that, after performing shaping by a shaping nozzle at the exit of the crosshead die and adjusting the shape by shaping rolls, a resin-impregnated long fiber bundle in pellet form (cylindrical form) was obtained by cutting the resultant fiber bundle into a predetermined length (length of the long fiber bundle of Table 1) through the use of a pelletizer.

Through confirmation by cutting the resin-impregnated long fiber bundle thus obtained, in Examples 1 to 5, the rayon fibers were substantially parallel to the longitudinal direction, and the resin was impregnated into the central part.

In the same way, through confirmation by cutting the resin-impregnated long fiber bundle of Comparative Example 1, although the rayon fibers were substantially parallel to the longitudinal direction in Comparative Example 1, the resin was not sufficiently impregnated into the central part.

Examples 1 to 5, Comparative Example 1

There were obtained the compositions made of the resin-impregnated long fiber bundles obtained in Production example 1.

Comparative Example 2

A cellulose fiber-containing composition was produced in accordance with the following method (method described in the Example of JP-A 2008-297479) by using the component shown in Table 1.

1st Step

A heater mixer (upper blade: kneading type, lower blade: for high circulation and high loading, provided with a heater and a thermometer, capacity 200 L) was heated at 140° C., a rod-like pulp sheet was charged into the mixer at an angle of 90 degrees, and stirred at an average peripheral speed of 50 m/second. At about 3 minutes later, the rod-like pulp sheet was changed to a flocculent pulp sheet.

2nd Step

Subsequently, after polypropylene was charged into the heater mixer, stirring was continued at an average peripheral speed of 50 m/second. The current value of the motor at this time was 30 A. When the temperature of the mixer reached 120° C., MPP was charged and stirring was continued.

After the passage of about 10 minutes, the power began to increase. Another minute later, since the current value rose to 50 A, a peripheral speed was decreased to a low speed of 25 m/sec. Furthermore, the power began to go up again by continuation of low speed mixing. One minute and a half later from the beginning of the low speed rotation, the current value reached 70 A, and then a discharge port of the mixer was opened and the resultant substance was discharged to a connected cooling mixer.

3rd Step

In the cooling mixer (rotation blade: standard blade for cooling, provided with a water-cooling means (20° C.) and a thermometer, capacity 500 L, cooler mixer) stirring was started at an average peripheral speed of 10 m/second, and stirring was terminated at the time when the temperature in the mixer reached 80° C. By processing of the 3rd step, a mixture of the cellulose fiber and polypropylene was solidified, and granular particles having a diameter of around several mm to 2 cm were obtained.

Comparative Examples 3 and 4

A fiber-containing composition was produced according to the following method (method similar to the method described in the Example of JP-A 2007-84713) by using the component shown in Table 1.

1st Step

A heater mixer (upper blade: kneading type, lower blade: for high circulation and high loading, provided with a heater and a thermometer, capacity 200 L) was heated at 140° C., polypropylene resin and rayon short fibers were charged into the mixer and stirred at an average peripheral speed of 50 m/second. When the temperature of the mixer reached 120° C., an acid-modified PP was charged and stirring was continued.

After the passage of about 10 minutes, the power began to increase. Another minute later, since the current value rose to 50 A, a peripheral speed was decreased to a low speed of 25 m/sec. Furthermore, the power began to go up again by the continuation of low speed mixing. One minute and a half later from the beginning of the low speed rotation, the current value reached 70 A, and then a discharge port of the mixer was opened and the resultant substance was discharged to a connected cooling mixer.

2nd Step

In the cooling mixer (rotation blade: standard blade for cooling, provided with a water-cooling means (20° C.) and a thermometer, capacity 500 L, cooler mixer) stirring was started at an average peripheral speed of 10 m/second, and stirring was terminated at the time when the temperature in the mixer reached 80° C. By processing of the 3rd step, a mixture of the cellulose fiber and polypropylene was solidified, and granular particles having a diameter of several mm to 2 cm were obtained.

Comparative Example 5

The commercial available product (Plastron PP-GF-20-02: manufactured by DAICEL POLYMER CO., LTD.) was used as the resin-impregnated long glass fiber bundle. This commercially available product was one in which the glass fibers were substantially parallel to the longitudinal direction, and the central part was impregnated with the resin.

<Components to be Used>

Component (A)

PP (polypropylene): J139 (manufactured by Prime Polymer Co., Ltd.)

Acid-modified PP: OREVAC CA100 (manufactured by ATOFINA Japan, Co., Ltd.), 1.0% maleic anhydride-modified Component (B)

Rayon fiber bundle 1: Use of 6,000 rayon fibers each having a fiber diameter of 12 μm, an X-ray orientation degree of 93%, a Young's modulus of 20 GPa Rayon fiber bundle 2: Use of 20,000 rayon fibers each having a fiber diameter of 12 μm, an X-ray orientation degree of 91%, a Young's modulus of 18 GPa Rayon fiber bundle 3: a bundle of 18,000 fibers obtained by unbundling and dividing the bundle of rayon fiber having a fiber diameter of 10 μm, an X-ray orientation degree of 91%, a Young's modulus of 13 GPa (TENCEL, registered trademark, manufactured by Lenzing Co., Ltd.)

(Comparative Components)

Rayon fiber bundle 1 for comparison: Use of 37,500 rayon fibers each having a fiber diameter of 9 μm, an X-ray orientation degree of 90%, a Young's modulus of 9 GPa Rayon short fiber 1: One obtained by cutting the rayon long fiber bundle 1 into 3 mm.

Rayon short fiber 2: One obtained by cutting the rayon long fiber bundle 3 into 3 mm.

Wood pulp: Pulp NDP-T (manufactured by Nippon Paper Industries Co., Ltd.), a fiber diameter of 25 μm, an average fiber length of 1.8 mm Long glass fiber-reinforced resin: Plastron PP-GF-20-02 (20% long glass fiber-reinforced polypropylene resin, manufactured by DAICEL POLYMER Co., Ltd.)

<Measuring Method>

(Tensile Modulus (Young's Modulus) of Rayon Fibers)

After three weeks storage under an air condition of 23° C. and 50 RH, measuring was performed at a distance between zippers of 200 mm, and a tensile rate of 200 rum/min.

(X-Ray Orientation Degree of Rayon Fiber)

An X-ray orientation degree was obtained by a transmission method. A scintillation counter was set to 2θ=20.1° which is equivalent to the diffraction degree of a surface (101), a fiber bundle was rotated vertically with respect to the incident X ray, a diffracted-X-ray strength of the azimuth angle ϕ was measured, and the X-ray orientation degree was calculated according to the following equation described in "Cellulose and Cellulose Derivatives" 2nd. ed., Vol. II, edited by E. Ott, M. Spurlin, Interscience publishers, New York (1954). In the equation, $\phi_{1/2}$ is a half width represented by an azimuth angles (degrees).

$$fc\ (\%) = \{(1-(\phi_{1/2}/180)\} \times 100$$

(Method for Preparing Test Specimen)

Under the following conditions, an ISO multi-purpose test specimen Type A configuration product (2 mm thickness) was prepared, and used as the test specimen for each of the following measurements.

Equipment: J-150EII manufactured by The Japan Steel Works LTD.

Cylinder temperature: 280° C.

Die temperature: 100° C.

Screw: Screw only for long fibers 1

Screw diameter: 51 mm

Gate shape: Side gate with 20 mm width (1) Tensile strength (MPa)

Measured in accordance with ISO527

(2) Bending strength (MPa)

Measured in accordance with ISO178

(3) Bending modulus (MPa)

Measured in accordance with ISO178

(4) Charpy impact strength (kJ/m$^2$)

The notched Charpy impact strength was measured in accordance with ISO179/1eA (5) Dispersion state of rayon fibers in molded article The surface of the test specimen was visually observed.

The case where the rayon fibers are well dispersed in the molded article, a lump (fiber bundle which remains without being opened) of the rayon fibers does not exist on the surface of the test specimen, but in case where the rayon fibers are badly dispersed, a lump (fiber bundle which remains without being opened) of the rayon fiber is observed on the surface of the test specimen.

TABLE 1

|  |  | Examples | | | | | Comparative Examples | | | | |
| --- | --- | --- | --- | --- | --- | --- | --- | --- | --- | --- | --- |
|  |  | 1 | 2 | 3 | 4 | 5 | 1 | 2 | 3 | 4 | 5 |
| Resin-impregnated long fiber bundle | (A) PP (J-139) | 72 | 59 | 67 | 67 | 67 | 61 | 67 | 67 | 67 |  |
|  | Acid-modified PP | 3 | 3 | 3 | 3 | 3 | 3 | 3 | 3 | 3 |  |
|  | PP-GF-20-02 |  |  |  |  |  |  |  |  |  | 100 |
|  | (B) Rayon long fiber bundle 1 | 25 |  | 30 |  |  |  |  |  |  |  |
|  | Rayon long fiber bundle 2 |  | 38 |  | 30 |  |  |  |  |  |  |
|  | Rayon long fiber bundle 3 |  |  |  |  | 35 |  |  |  |  |  |
|  | Rayon long fiber bundle for comparison 1 |  |  |  |  |  | 36 |  |  |  |  |
|  | Fiber diameter (μm) | 12 | 12 | 12 | 12 | 10 | 9 | 25 | 12 | 12 |  |
|  | X-ray orientation degree (%) | 93 | 91 | 93 | 91 | 91 | 90 |  |  |  |  |
|  | Number of fibers composed of fiber bundles | 6000 | 20000 | 6000 | 20000 | 18000 | 37500 |  |  |  |  |
|  | Length of resin-impregnated long fiber bundle (mm) | 9 | 9 | 9 | 9 | 9 | 9 |  |  |  | 11 |
| Fiber for comparison | Rayon short fiber 1 |  |  |  |  |  |  |  |  | 30 |  |
|  | Rayon short fiber 2 |  |  |  |  |  |  |  | 30 |  |  |
|  | Wood pulp |  |  |  |  |  |  | 30 |  |  |  |
| Evaluation items | Density (g/cm$^3$) | 1.01 | 1.05 | 1.03 | 1.03 | 1.04 | 1.05 | 1.03 | 1.03 | 1.03 | 1.03 |
|  | Bending modulus (MPa) | 5300 | 6200 | 6000 | 5200 | 5500 | 4200 | 3900 | 3600 | 4000 | 4500 |
|  | Specific modulus | 5250 | 5910 | 5830 | 5050 | 5288 | 4000 | 3790 | 3500 | 3880 | 4370 |
|  | Tensile strength (MPa) | 75 | 94 | 82 | 84 | 87 | 65 | 41 | 36 | 45 | 100 |
|  | Bending strength (MPa) | 105 | 135 | 119 | 120 | 125 | 107 | 72 | 62 | 74 | 140 |
|  | Dispersion state | Good | Good | Good | Good | Good | Bad | Good | Good | Good | Good |

By making a comparison between Examples 1 to 5 and Comparative Examples 1 to 4, it was able to be confirmed that the mechanical strength of the molded articles in which the resin-impregnated rayon long fiber bundles of Examples 1 to 5 were used was superior.

Although the resin-impregnated rayon long fiber bundle was used in Comparative Example 1, the impregnation with the resin (PP) up to the central part of the fiber bundle was not carried out as described in Production example 1, and thus it has been confirmed that bundle (lump)-like fibers in which the fiber bundle was not opened sufficiently and many fibers gathered were not dispersed. For this reason, in comparison with Examples 1 to 5, it has been recognized that the mechanical strength was inferior.

Comparative Example 5 is an example in which the resin-impregnated long glass fiber bundle was used, and the specific modulus in Comparative Example 5 was inferior to that in Examples 1 to 5. This result shows that the rayon fibers were excellent in performance as a reinforcement fiber for reinforcing long fiber for the improvement of modulus (balance between density and Young's modulus) even in comparison with glass fiber.

The invention claimed is:

1. A fiber-reinforced resin composition comprising a resin-impregnated long fiber bundle including (A) a thermoplastic resin and (B) a rayon fiber, wherein
    the rayon fiber of component (B) has a fiber diameter of 5 to 30 μm and an X-ray orientation degree of 90% or more, and
    the resin-impregnated long fiber bundle is obtained by impregnating a bundle of 2,000 to 30,000 rayon fibers of component (B) in a state where the rayon fibers are arranged in the longitudinal direction, with the thermoplastic resin of the component (A) in a molten state to thereby form an integrated bundle, and then cutting the integrated bundle into a length of 3 to 30 mm.

2. The fiber-reinforced resin composition according to claim 1, wherein the rayon fiber of component (B) has a tensile modulus of 10 GPa or more.

3. The fiber-reinforced resin composition according to claim 1, wherein the rayon fiber of component (B) has a tensile modulus of 13 GPa or more.

4. The fiber-reinforced resin composition according to claim 1, wherein the thermoplastic resin of component (A) is selected from a polyolefin resin and a polyamide resin.

5. The fiber-reinforced resin composition of claim 1, wherein the thermoplastic resin of component (A) includes polypropylene and maleic acid-modified polypropylene and/or maleic anhydride-modified polypropylene and
    an acid amount in component (A) is, on average, 0.005 to 0.5% by mass in terms of maleic anhydride.

6. The fiber-reinforced resin composition of claim 1, wherein the thermoplastic resin of component (A) is selected from an aliphatic polyamide of polyamide 6, polyamide 69, polyamide 610, polyamide 612, polyamide 11 and polyamide 12.

7. A molded article obtained from the fiber-reinforced resin composition of claim 1.

8. The molded article according to claim 7, wherein a specific modulus of a 4 mm thick molded article is 4,000 MPa or more.

9. The molded article according to claim 7, wherein a specific modulus of a 4 mm thick molded article is 4,500 MPa or more.

* * * * *